(12) United States Patent
Michel et al.

(10) Patent No.: US 7,010,071 B1
(45) Date of Patent: Mar. 7, 2006

(54) METHOD OF GENERATING AND/OR DETECTING SYNCHRONIZATION SEQUENCES, SYNCHRONIZATION METHOD, TRANSMITTER UNIT AND RECEIVER UNIT

(75) Inventors: Juergen Michel, Munich (DE); Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/018,436

(22) PCT Filed: Feb. 16, 2000

(86) PCT No.: PCT/EP00/01263

§ 371 (c)(1),
(2), (4) Date: Oct. 29, 2001

(87) PCT Pub. No.: WO00/67405

PCT Pub. Date: Nov. 9, 2000

(30) Foreign Application Priority Data

Apr. 29, 1999 (DE) .............................. 199 19 545
May 18, 1999 (EP) ................................ 99109791

(51) Int. Cl.
*H03D 1/00* (2006.01)
*H04D 27/06* (2006.01)

(52) U.S. Cl. ..................... 375/354; 375/343; 375/149; 375/152

(58) Field of Classification Search ............... 375/354, 375/343, 149, 152, 367, 340; 370/342, 350, 370/441; 714/783
See application file for complete search history.

(56) References Cited

U.S. PATENT DOCUMENTS

| 5,748,686 A | * | 5/1998 | Langberg et al. | ........... 375/367 |
| 5,751,774 A | * | 5/1998 | Wang | ......................... 375/367 |
| 5,805,646 A | * | 9/1998 | Wang | ......................... 375/354 |
| 6,256,304 B1 | * | 7/2001 | Vayrynen | ................... 370/350 |
| 6,567,482 B1 | * | 5/2003 | Popovic' | ..................... 375/343 |

FOREIGN PATENT DOCUMENTS

| HU | 218 335 | 1/1996 |
| WO | WO 94/08403 | 4/1994 |
| WO | WO 96/39749 | 12/1996 |
| WO | WO 00/014915 | 3/2000 |

OTHER PUBLICATIONS

Efficient Pulse Compressor for Golay Complementary Sequences.
Golay Complementary Sequences are Superior to PN Sequences, Budisin, pagew 101-104.
XP-000791008, Concatenated Sequences for Spread Spectrum Systems, Maskara, pp. 342-350.
XP-000107922—Electronics Letters 26(Jun. 21, 1990) No. 13.

* cited by examiner

*Primary Examiner*—Emmanuel Baynard
*Assistant Examiner*—Lawrence B. Williams
(74) *Attorney, Agent, or Firm*—Bell, Boyd & Lloyd LLC (57) ABSTRACT

Method for forming and/or determining a synchronization sequence, a synchronization method, a transmitting unit and a receiving unit, the formation of synchronization sequences, which are based on partial signal sequences, includes a second partial signal sequence being repeated and modulated in the process by a first partial signal sequence.

16 Claims, 8 Drawing Sheets

METHOD OF GENERATING AND/OR DETECTING SYNCHRONIZATION SEQUENCES, SYNCHRONIZATION METHOD, TRANSMITTER UNIT AND RECEIVER UNIT

BACKGROUND OF THE INVENTION

In signal transmission systems, such as mobile radio systems, it is necessary for one of the communication partners (first transmission unit) to detect specific fixed signals which are emitted by another communication partner (second transmission unit). These can be, for example, what are termed synchronization bursts for synchronizing two synchronization partners such as radio stations, for example, or what are termed access bursts.

In order to detect or identify such received signals reliably by contrast with the ambient noise, it is known to correlate the received signal continuously with a prescribed synchronization sequence over a fixed time duration, and to form the correlation sum over the time duration of the prescribed synchronization sequence. The range of the received signal, which yields a maximum correlation sum, corresponds to the signal being searched for. Connected upstream, as what is termed a training sequence, of the synchronization signal from the base station of a digital mobile radio system is, for example, a synchronization sequence which is detected or determined in the mobile station in the way just described by correlation with the stored synchronization sequence.

Such correlation calculations are also necessary in the base station; for example in the case of random-access-channel (RACH) detection. Moreover, a correlation calculation is also carried out to determine the channel pulse response and the signal propagation times of received signal bursts.

The correlation sum is calculated as follows in this case:

$$Sm = \sum_{i=0}^{n-1} E(i+m) * K(i)$$

E(i) being a received signal sequence derived from the received signal, and K(i) being the prescribed synchronization sequence, i running from 0 to n−1. The correlation sum Sm is calculated sequentially for a number of temporally offset signal sequences E(i) obtained from the received signal, and then the maximum value of Sm is determined. If k sequential correlation sums are to be calculated, the outlay on calculation is k*n operations, a multiplication and addition being counted together as one operation.

The calculation of the correlation sums is, therefore, very complicated and, particularly in real time applications such as voice communication or video-telephony or in CDMA systems, requires powerful and expensive processors which have a high power consumption during calculation. For example, a known synchronization sequence of length 256 chips (a transmitted bit is also termed a chip in CDMA) is to be determined for the purpose of synchronizing the UMTS mobile radio system, which is being standardized. The sequence is repeated every 2560 chips. Since the mobile station initially operates asynchronously relative to the chip clock, the received signal must be oversampled in order still to retain an adequate signal even given an unfavorable sampling situation. Because of the sampling of the I and Q components, this leads to 256*2560*2*2=2621440 operations.

WO 96 39749 A discloses transmitting a synchronization sequence, a chip of the sequence itself being a sequence.

"Srdjan Budisin: Golay Complementary Sequences are Superior to PN Sequences, Proceedings of the International Conference on Systems Engineering, US, New York, IEEE, Vol. 1992, pages 101–104, XP 000319401 ISBN: 0-7803-0734-8" discloses using Golay sequences as an alternative to PN sequences.

It is an object of the present invention to specify methods for synchronizing a base station with a mobile station, as well as to specify both a base station and a mobile station, which permits synchronization of a base station with a mobile station and which is reliable and favorable in terms of outlay.

SUMMARY OF THE INVENTION

In this case, firstly, the present invention is based on the idea of forming what is termed a "hierarchical sequence"; in particular, a hierarchical synchronization sequence y(i) which is based in accordance with the following relationship on a first constituent sequence x1 of length n1 and a second constituent sequence x2 of length n2:

$y(i)=x_2(i \bmod n_2)*x_1(i \text{ div } n_2)$ for $i=0 \ldots (n_1*n_2)-1$

This design principle of a hierarchical synchronization sequence envisages a repetition of a constituent sequences in their full length, the repetitions being modulated with the value of the corresponding element of the second constituent sequence. It is, thereby, possible to form synchronization sequences which can be determined easily when they are contained in a received signal sequence. Such synchronization sequences have good correlation properties and permit efficient calculation of the correlation in a mobile station. It was possible to show this via complex simulation tools created specifically for this purpose.

Furthermore, the present invention is based on the finding that, in the case of the use of a hierarchical sequence as synchronization sequence which is based on two constituent sequences, it is possible to achieve a further reduction in complexity at the receiving end when at least one constituent sequence itself is a hierarchical sequence.

It is provided in this case that only one repetition of the first half (or another part) of the first constituent sequence is carried out, followed thereupon by the second half and its repetitions. The repetitions are modulated once again with the value of the corresponding element of the second constituent sequence. A parameter s is introduced which specifies the part of the constituent sequence which is repeated as a coherent piece. The formula describing this generalized developed formulation for forming "generalized hierarchical sequences" runs:

$x_1(i)=x_4(i \bmod s + s \cdot (i \text{ div } sn_3)) \cdot x_3((i \text{ div } s) \bmod n_3),$
for $i=0. \ldots n_3 \cdot n_4-1$ For $s=n_4$, this relationship for describing "generalized hierarchical sequences" is equivalent to the relationship explained above for forming "hierarchical synchronization sequences".

Within the scope of the present invention, "constituent sequences" as well as "partial signal sequences" are denoted as K1 and K2, respectively, or as x1 and $x_1$, respectively, or as x2 and $x_2$, respectively. "Synchronization sequences" or "synchronization codes" are also denoted as "y(i)" or "K(i)".

Of course, "determination of a synchronization sequence" is also understood as the determination of the temporal position of a synchronization sequence. The term "received signal sequence" is also understood as a signal sequence which is derived from a received signal by demodulation, filtering, derotation, scaling or analog-to-digital conversion, for example.

A development of the present invention is based on the finding that, in the case of the use of a hierarchical sequence as synchronization sequence which is based on two constituent sequences, at least one constituent sequence being a Golay sequence, it is possible to achieve a further reduction in complexity at the receiving end.

It was possible through the use of complicated simulations to find parameters for describing Golay sequences which are particularly well suited as constituent sequences.

Specific refinements of the present invention provide for using constituent sequences of length 16 to form a hierarchical 256 chip sequence; in particular, a synchronization sequence, a first constituent sequence being a Golay sequence, and a second constituent sequence being a generalized hierarchical sequence whose constituent sequences are based on two Golay sequences (of length 4). For example, $x_2$ is defined as the Golay sequence of length 16 which is obtained by the delay matrix $D^2=[8, 4, 1, 2]$ and the weight matrix $W^2=[1, -1, 1, 1]$. $x_1$ is a generalized hierarchical sequence, in which case s=2 and the two Golay sequences $x_3$ and $x_4$ are used as constituent sequences. $x_3$ and $x_4$ are identical and are defined as Golay sequences of length 4 which are described by the delay matrix $D^3=D^4=[1, 2]$ and the weight matrix $W^3=W^4=[1, 1]$.

A Golay sequence $a_N$, also denoted as a Golay complementary sequence, can be formed in this case using the following relationship:

$a_0(k) = \delta(k)$ and $b_0(k) = \delta(k)$ $a_n(k) = a_{n-1}(k) + W_n \cdot b_{n-1}(k-D_n)$, $b_n(k) = a_{n-1}(k) - W_n \cdot b_{n-1}(k-D_n)$, $k = 0, 1, 2, \ldots 2^N$, $n = 1, 2, \ldots, N$.

$\delta(k)$ Kronecker delta function
D Delay matrix
W Weight matrix

Additional features and advantages of the present invention are described in, and will be apparent from, the following Detailed Description of the Invention and the Figures.

DETAILED DESCRIPTION OF THE INVENTION

Figure 1:
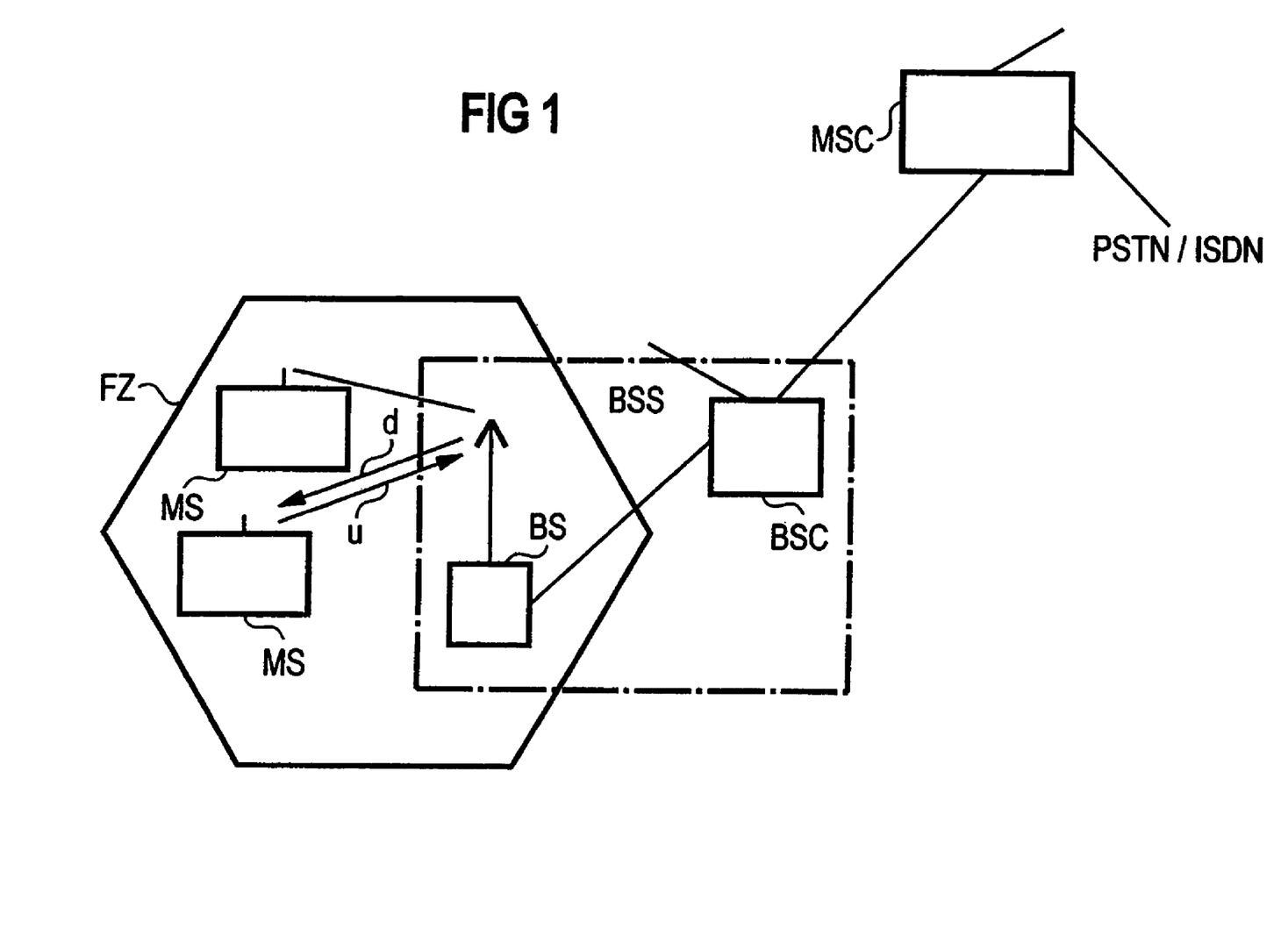
FIG. 1 shows a schematic of a mobile radio network.

Illustrated in FIG. 1 is a cellular mobile radio network such as, for example, the GSM (Global System for Mobile Communication), which includes comprises a multiplicity of mobile switching centers MSC which are networked with one another and/or provide access to a fixed network PSTN/ISDN. Furthermore, these mobile switching centers MSC are connected to, in each case, at least one base station controller BSC, which can also be formed by a data processing system. A similar architecture is also to be found in a UMTS (Universal Mobile Telecommunication System).

Each base station controller BSC is connected, in turn, to at least one base station BS. Such a base station BS is a radio station which can use an air interface to set up a radio link to other radio stations, what are termed mobile stations MS. Information inside radio channels f which are situated inside frequency bands b can be transmitted via radio signals between the mobile stations MS and the base station BS assigned to these mobile stations MS. The range of the radio signals of a base station substantially defines a radio cell FZ.

Base stations BS and a base station controller BSC can be combined to form a base station system BSS. The base station system BSS is also responsible in this case for radio channel management and/or assignment, data rate matching, monitoring the radio transmission link, hand-over procedures and, in the case of a CDMA system, assigning the spread code set to be used, and transfers the signaling information required for this purpose to the mobile stations MS.

For FDD (Frequency-Division Duplex) systems such as the GSM, it is possible in the case of a duplex system to provide for the uplink u (mobile station (transmitting unit) to the base station (receiving unit)) frequency bands differing from those for the downlink d (base station (transmitting unit) to the mobile station (receiving unit)). A number of frequency channels f can be implemented within the different frequency bands b via an FDMA (Frequency-Division Multiple Access) method.

Within the scope of the present application, the transmission unit is also understood as a communication unit, transmitting unit, receiving unit, communication terminal, radio station, mobile station or base station. Terms and examples used within the scope of this application frequently refer also to a GSM mobile radio system; however, they are not in any way limited thereto, but easily can be mapped by a person skilled in the art with the aid of the description onto other, possibly future, mobile radio systems. Such systems would include, for example, CDMA systems; in particular, wide-band CDMA systems.

Data can be efficiently transmitted, separated and assigned to one or more specific links and/or to the appropriate subscriber via an air interface via multiple access methods. It is possible to make use for this purpose of time-division multiple access TDMA, frequency-division multiple access FDMA, code-division multiple access CDMA or a combination of a number of these multiple access methods.

In FDMA, the frequency band b is broken down into a number of frequency channels f. These frequency channels are split up into time slots ts via time-division multiple access TDMA. The signals transmitted within a time slot ts and a frequency channel f can be separated via spread codes, what are termed CDMA codes cc, that are modulated in a link-specific fashion onto the data.

The physical channels thus produced are assigned to logic channels according to a fixed scheme. The logic channels are basically distinguished into two types: signaling channels (or control channels) for transmitting signaling information (or control information), and traffic channels (TCH) for transmitting useful data.

The signaling channels are further subdivided into:
broadcast channels
common control channels
dedicated/access control channels DCCH/ACCH The group of broadcast channels includes the broadcast control channel BCCH, through which the MS receives radio information from the base station system BSS, the frequency correction channel FCCH and the synchronization channel SCH. The common control channels include the random access channel RACH. The bursts or signal sequences that are transmitted to implement these logic channels can include, in this case, for different purposes synchronization sequences K(i), what are termed correlation sequences, or synchronization sequences K(i) can be transmitted on these logic channels for different purposes.

A method for synchronizing a mobile station MS with a base station BS is explained now by way of example. During a first step of the initial search for a base station or search for a cell (initial cell search procedure), the mobile station uses the primary synchronization channel (SCH (PSC)) in order to achieve a time slot synchronization with the strongest base station. This can be ensured via a matched filter or an appropriate circuit which is matched to the primary synchronization code cp (synchronization sequence) that is emitted by all the base stations. In this case, all the base stations BS emit the same primary synchronization code cp of length 256.

The mobile station uses correlation to determine from a received sequence the received synchronization sequences K(i). In this case, peaks are output at the output of a matched filter for each received synchronization sequence of each base station located within the reception area of the mobile station. The detection of the position of the strongest peak permits the determination of the timing of the strongest base station modulo of the slot length. In order to ensure a greater reliability, the output of the matched filter can be accumulated over the number of time slots in a non-coherent fashion. The mobile station therefore carries out a correlation over a synchronization sequence of length 256 chips as a matched-filter operation.

The synchronization code cp can be formed in this case according to a hierarchical synchronization sequence K(i) or y(i) using the following relationships from two constituent sequences $x_1$ and $x_2$ of length $n_1$ and $n_2$ respectively:

$$y(i)=x_2(i \bmod n_2)*x_1(i \ div \ n_2) \text{ for } i=0 \ldots (n_1*n_2)-1$$

The constituent sequences $x_1$ and $x_2$ are of length 16 (that is to say, $n1=n_2=16$), and are defined by the following relationships:

$$x_1(i)=x_4(i \bmod s+s*(i \ div \ sn_3))*x_3((i \ div \ s) \bmod n_3),$$
$$i=0 \ldots (n_3*n_4)-1$$

$x_1$ is, thus, a generalized hierarchical sequence using the above formula, in which case s=2 is selected and the two Golay sequences $x_3$ and $x_4$ are used as constituent sequences.

$x_2$ is defined as the Golay sequence of length 16 ($N_2=2$) which is obtained via the delay matrix $D^2=[8, 4, 1, 2]$ and the weight matrix $W^2=[1, -1, 1, 1]$.

$x_3$ and $x_4$ are identical Golay sequences of length 4 (N=2), which are defined by the delay matrix $D^3=D^4=[1, 2]$ and the weight matrix $W^3=W^4=[1, 1]$.

The Golay sequences are defined using the following recursive relationship:

$$a_0(k)=\delta(k) \text{ and } b_0(k)=\delta(k)$$

$$a_n(k)=a_{n-1}(k)+W_n \cdot b_{n-1}(k-D_n),$$

$$b_n(k)=a_{n-1}(k)-W_n \cdot b_{n-1}(k-D_n),$$

$$k=0, 1, 2, \ldots, 2^N.$$

$$n=1, 2, \ldots, N.$$

$a_N$ then defines the required Golay sequence.

Figure 2:
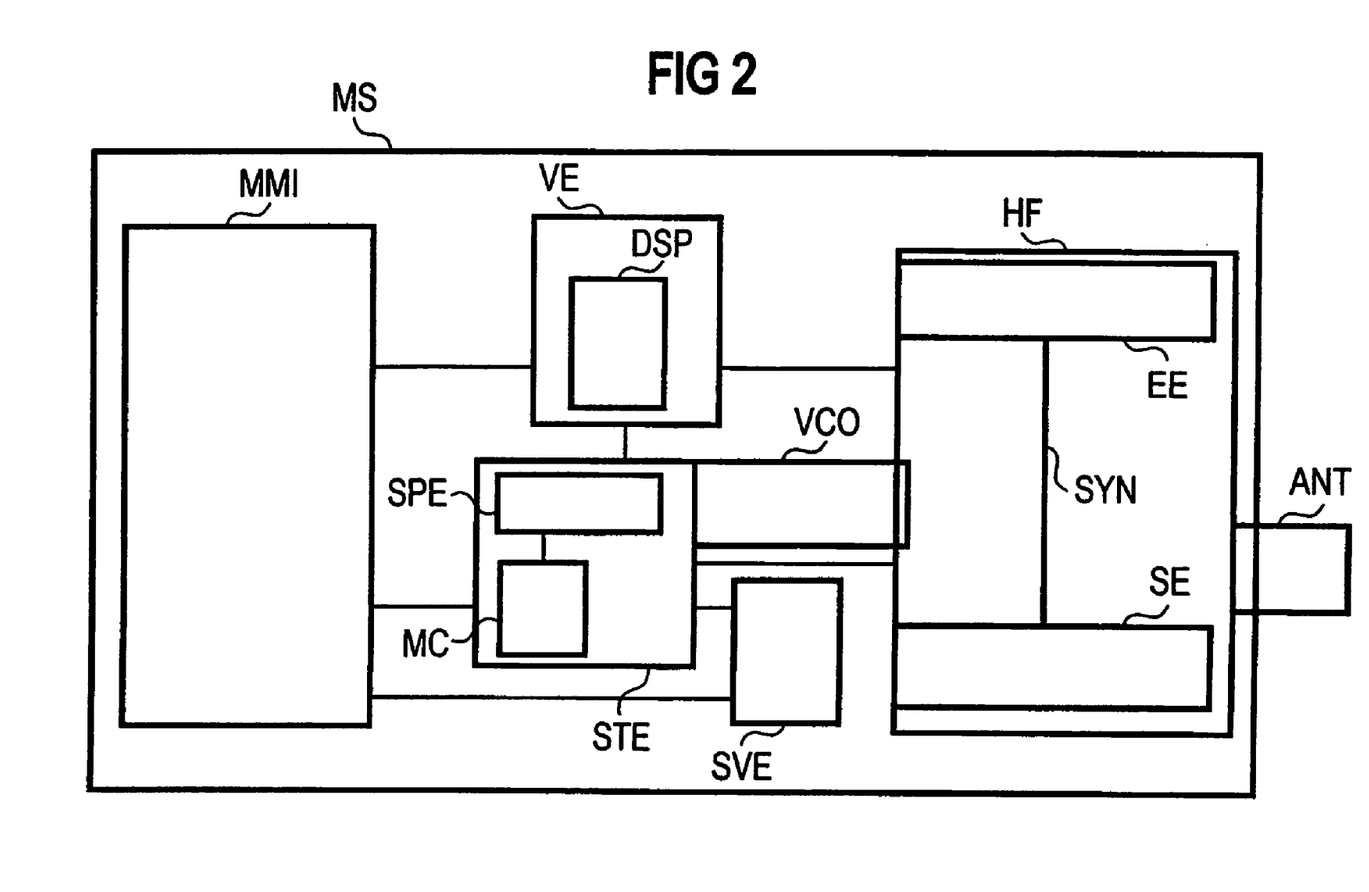
FIG. 2 shows a block diagram of a radio station.

FIG. 2 shows a radio station which can be a mobile station MS, which includes an operating unit or interface unit MMI, a control device STE, a processing device VE, a power supply device SVE, a receiving device EE and, if appropriate, a transmitting device SE.

The control device STE essentially includes a program-controlled microcontroller MC which can access memory chips SPE by writing and reading. The microcontroller MC controls and monitors all essential elements and functions of the radio station.

The processing device VE also can be formed by a digital signal processor DSP, which can likewise access memory chips SPE. Addition and multiplication also can be achieved via the processing device VE.

The microcontroller MC and/or the digital signal processor DSP and/or storage devices SPE and/or further computing elements known as such to a person skilled in the art can be combined in this case to form a processor device which is set up in such a way that the method of the present invention can be carried out.

The program data required for controlling the radio station and the communication cycle, as well as, in particular, the signaling procedures, and information produced during the processing of signals are stored in the volatile or non-volatile memory chips SPE. Moreover, synchronization sequences K(i) which are used for correlation purposes, and intermediate results of correlation sum calculations can be stored therein. The synchronization sequences K(i) within the scope of the present invention can, thus, be stored in the mobile station and/or the base station. It is also possible for one or more of parameters for defining synchronization sequences or partial signal sequences or partial signal sequence pairs (K1(j); K2(k)) derived therefrom to be stored in the mobile station and/or the base station. It is also possible for a synchronization sequence K(i) to be formed from a partial signal sequence pair (K1(j); K2(k)) and/or one or more parameters for defining synchronization sequences or partial signal sequences derived therefrom in the mobile station and/or the base station.

In particular, it is possible to store in a base station, or in all the base stations in a system, a synchronization sequence K(i) which is emitted at fixed or variable intervals for synchronization purposes. Constituent sequences (partial signal sequences) or parameters from which the synchronization sequence K(i) stored in the base station can be, or are, formed are stored in the mobile station MS and are used to synchronize the mobile station with a base station in order to calculate the correlation sum favorably in terms of computational outlay.

The storage of the synchronization sequences or the partial signal sequences or parameters also can be performed by storing appropriate information in arbitrarily coded form, and can be implemented with the aid of storage devices such as, for example, volatile and/or nonvolatile memory chips or via appropriately designed adder or multiplier inputs or appropriate hardware configurations which have the same effect.

The high-frequency section HF includes if appropriate, the transmitting device SE, with a modulator and an amplifier V, and a receiving device EE with a demodulator and, likewise, an amplifier. The analog audio signals and the analog signals originating from the receiving device EE are converted via analog-to-digital conversion into digital signals and processed by the digital signal processor DSP. After processing, the digital signals are converted, if appropriate, by digital-to-analog conversion into analog audio signals or other output signals and analog signals that are to be fed to the transmitting device SE. Modulation or demodulation, respectively, is carried out for this purpose, if appropriate.

The transmitting device SE and the receiving device EE are fed with the frequency of a voltage-controlled oscillator VCO via the synthesizer SYN. The system clock for timing processor devices of the radio station also can be generated via the voltage-controlled oscillator VCO.

An antenna device ANT is provided for receiving and for transmitting signals via the air interface of a mobile radio system. The signals are received and transmitted in what are termed bursts that are pulsed over time in the case of some known mobile radio systems such as the GSM (Global System for Mobile Communication).

The radio station also may be a base station BS. In this case, the loudspeaker element and the microphone element of the operating unit MMI are replaced by a link to a mobile radio network, for example via a base station controller BSC or a switching device MSC. The base station BS has an appropriate multiplicity of transmitting and receiving devices, respectively, in order to exchange data simultaneously with a number of mobile stations MS.

Figure 3:
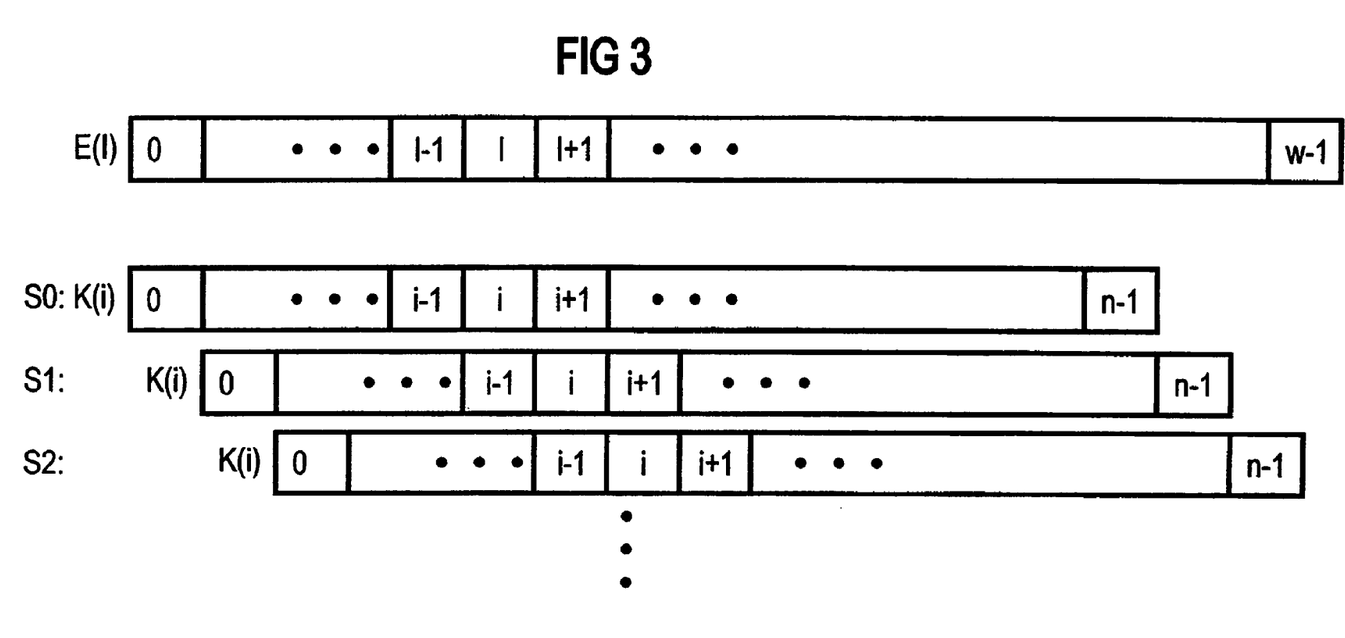
FIG. 3 shows a conventional method for calculating correlation sums.

A received signal sequence $E(1)$, which also can be a signal sequence derived from a received signal, of length W is illustrated in FIG. 3. In order to calculate a first correlation sum $S0$ in accordance with the formula specified at the beginning, elements of a first section of this received signal sequence $E(1)$ are multiplied in pairs by the corresponding elements of the synchronization sequence $K(i)$ of length n, and the length of the resulting partial results is added to the correlation sum $S0$.

In order to calculate a further correlation sum $S1$, as illustrated in the FIG. 3, the synchronization sequence $K(i)$ is shifted to the right by one element, and the elements of the synchronization sequence $K(i)$ are multiplied in pairs by the corresponding elements of the signal sequence $E(1)$, and the correlation sum $S1$ is formed again by summing the partial results produced.

The pairwise multiplication of the elements of the synchronization sequence by corresponding elements of the received signal sequence, and the subsequent summation also can be described in vector notation as the formation of a scalar product, if the elements of the synchronization sequence and the elements of the received synchronization sequence are respectively combined to form a vector:

$$S0 = \begin{pmatrix} K(0) \\ \vdots \\ K(i) \\ \vdots \\ K(n-1) \end{pmatrix} * \begin{pmatrix} E(0) \\ \vdots \\ E(i) \\ \vdots \\ E(n-1) \end{pmatrix} =$$

$$K(0)*E(0) + \ldots + K(i)*E(i) + \ldots + K(n-1)*E(n-1)$$

$$S1 = \begin{pmatrix} K(0) \\ \vdots \\ K(i) \\ \vdots \\ K(n-1) \end{pmatrix} * \begin{pmatrix} E(1) \\ \vdots \\ E(i+1) \\ \vdots \\ E(n) \end{pmatrix} =$$

$$K(0)*E(1) + \ldots + K(i)*E(i+1) + \ldots + K(n-1)*E(n)$$

In the correlation sums S thus determined, it is possible to search for the maximum and compare the maximum of the correlation sums S with a prescribed threshold value and, thus, determine whether the prescribed synchronization sequence $K(i)$ is included in the received signal $E(1)$ and, if so, where it is located in the received signal $E(1)$ and thus two radio stations are synchronized with one another or data are detected on to which an individual spread code has been modulated in the form of a synchronization sequence $K(i)$.

Figure 4A:
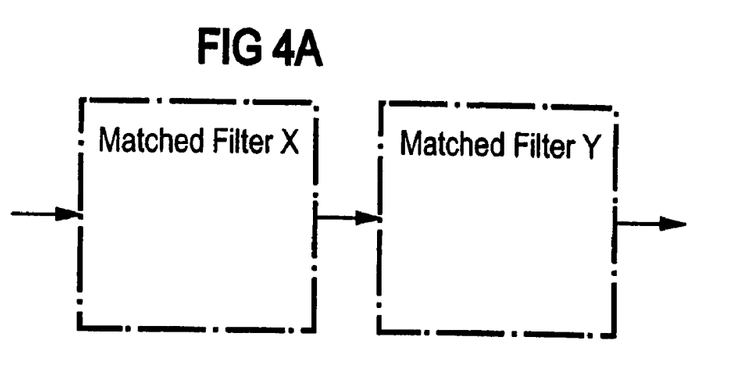
FIGS. 4, 5, 6, 7 and 8 show block diagrams of efficient Golay correlators in connection with the teachings of the present invention.
Figure 4B:
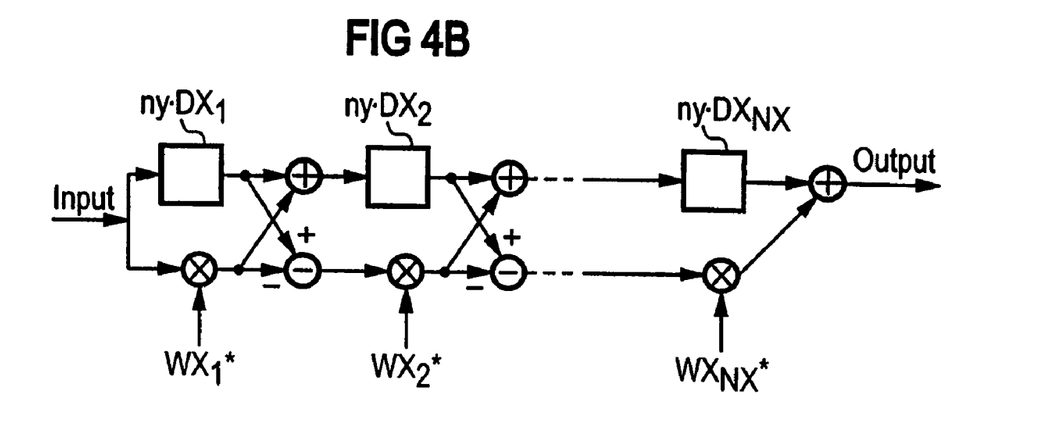
Figure 4C:
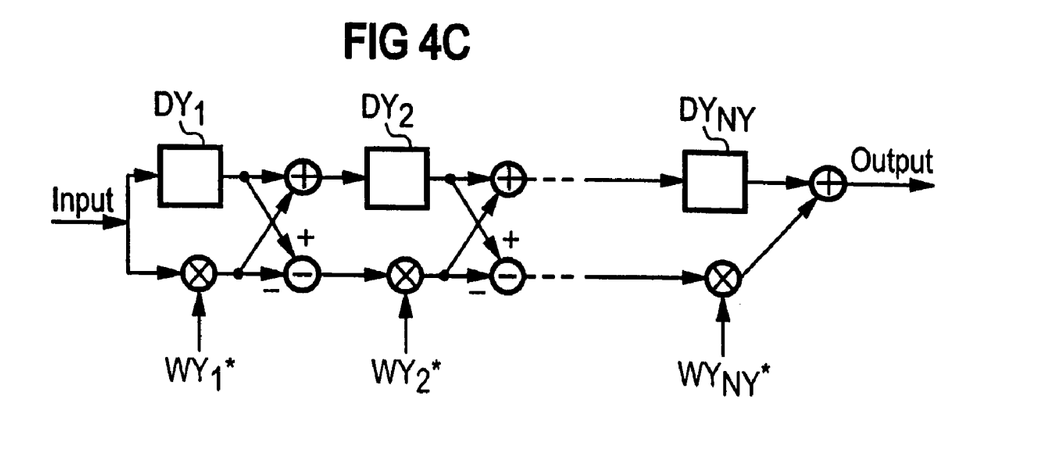

FIG. 4 shows an efficient hierarchical correlator for synchronization sequences, Golay sequences X, Y of length nx and ny respectively being used as constituent sequences K1, K2. The correlator consists of two series-connected matched filters (FIG. 4 a) which are respectively formed as efficient Golay correlators. FIG. 4 b shows the matched filter for the sequence X, and FIG. 4 c shows the matched filter for the sequence Y.

The following designations apply in FIG. 4 b:

| | |
|---|---|
| $n = 1, 2, \ldots NX$ | |
| ny | length of sequence Y |
| nx | length of sequence X |
| NX | with $nx = 2^{NX}$ |
| $DX_n$ | $DX_n = 2^{PX_n}$ |
| $PX_n$ | permutation of the numbers $\{0, 1, 2, \ldots, NX-1\}$ for the partial signal sequence X |
| $WX_n$ | weights for the partial signal sequence X from $(+1, -1, +i$ or $-i)$. |

The following designations apply in FIG. 4 c:

| | |
|---|---|
| $n = 1, 2, \ldots NY$ | |
| ny | length of sequence Y |
| NY | with $ny = 2^{NY}$ |
| $DY_n$ | $DY_n = 2^{PY_n}$ |
| $PY_n$ | permutation of the numbers $\{0, 1, 2, \ldots, NY-1\}$ for the partial signal sequence Y |
| $WY_n$ | weights for the partial signal sequence Y from $(+1, -1, +i$ or $-i)$. |

Moreover, the following definitions and designations are valid in this variant design:

$a_n(k)$ and $b_n(k)$ are two complex sequences of length $2^N$,
$\delta(k)$ is the Kronecker delta function,
k is an integer representing time,
n is the iteration number,
$D_n$ is the delay,
$P_n$, $n=1, 2, \ldots, N$, is an arbitrary permutation of the numbers $\{0, 1, 2, \ldots, N-1\}$,
$W_n$ can assume the values $+1, -1, +i, -i$ as weights.

The correlation of a Golay sequence of length $2^N$ can be carried out efficiently as follows:

The sequences $R_a^{(0)}(k)$ and $R_b^{(0)}(k)$ are defined as $R_a^{(0)}(k) = R_b^{(0)}(k) = r(k)$, $r(k)$ being the received signal or the output of another correlation stage.

The following step is executed N times, n running from 1 to N:

Calculate $$R_a^{(n)}(k) = W^*_n * R_b^{(n-1)}(k) + R_a^{(n-1)}(k-D_n)$$

And $$R_b^{(n)}(k) = W^*_n * R_b^{(n-1)}(k) + R_a^{(n-1)}(k-D_n)$$

In this case, $W^*_n$ designates the complex conjugate of $W_n$. If the weights W are real, $W^*_n$ is identical to $W_n$.

$R_a^{(n)}(k)$ is then the correlation sum to be calculated.

An efficient Golay correlator for a synchronization sequence of length 256 ($2^8$) chips in the receiver generally has 2*·8−1=15 complex adders.

With the combination of hierarchical correlation and efficient Golay correlator, a hierarchical code—(described by two constituent sequences X and Y)— of length 256 ($2^4 \cdot 2^4$) requires only 2·4−1+2·4−1=14 complex adders (even in the case when use is made of four-valued constituent sequences).

Figure 5:
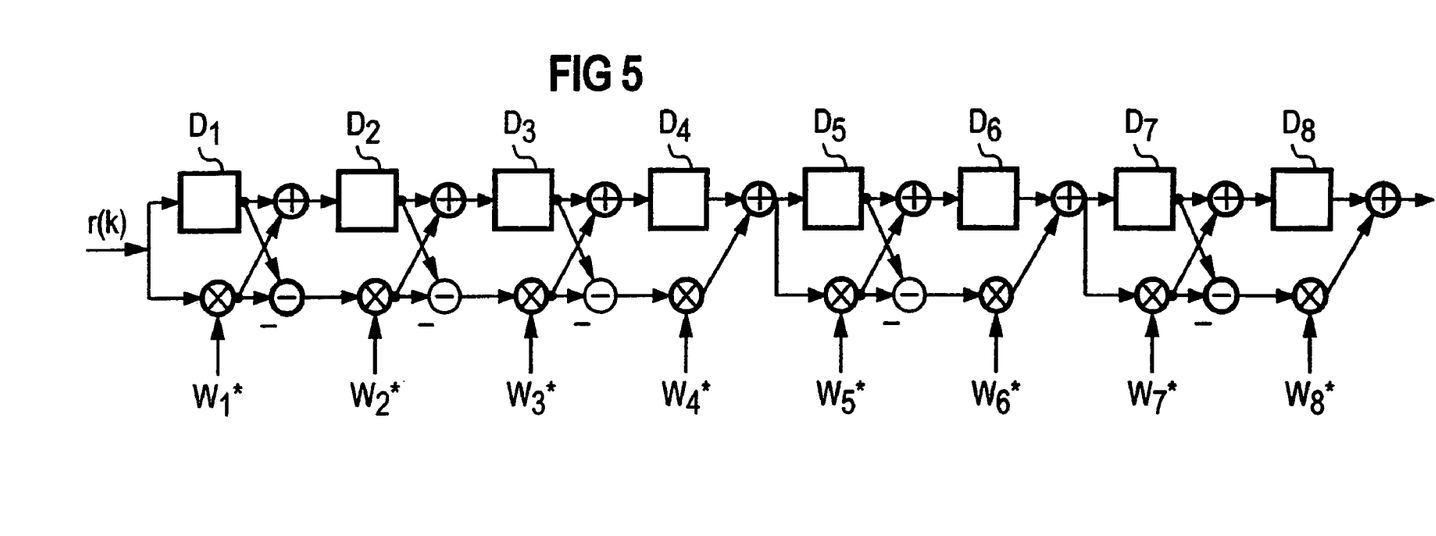

This reduces by 7% the outlay on calculation, which is very high for the primary synchronization in CDMA mobile radio systems, because efficient hierarchical correlators and Golay correlators can be combined. A possible implementation of the overall correlator, an efficient truncated Golay correlator for generalized hierarchical Golay sequences, is shown in FIG. 5. This is also designated as a truncated Golay correlator, because one of the outputs is truncated in specific stages, and instead of this another output is used as input for the next stage.

The vector D is defined by D=[128, 16, 64, 32, 8, 4, 1, 2] and W=[1, −1, 1, 1, 1, 1, 1, 1]. This correlator requires only 13 additions per calculated correlation sum.

By comparison with a sequence having a simple hierarchical or Golay-supported structure, the generalized hierarchical Golay sequence offers advantages based on more efficient options for calculating the correlation sum with the aid of this Golay sequence. However, simulations exhibit good results with regard to slot synchronization even in the case of relatively high frequency errors.

The hierarchical Golay sequences are compared below with the two simple methods.

Figure 6:
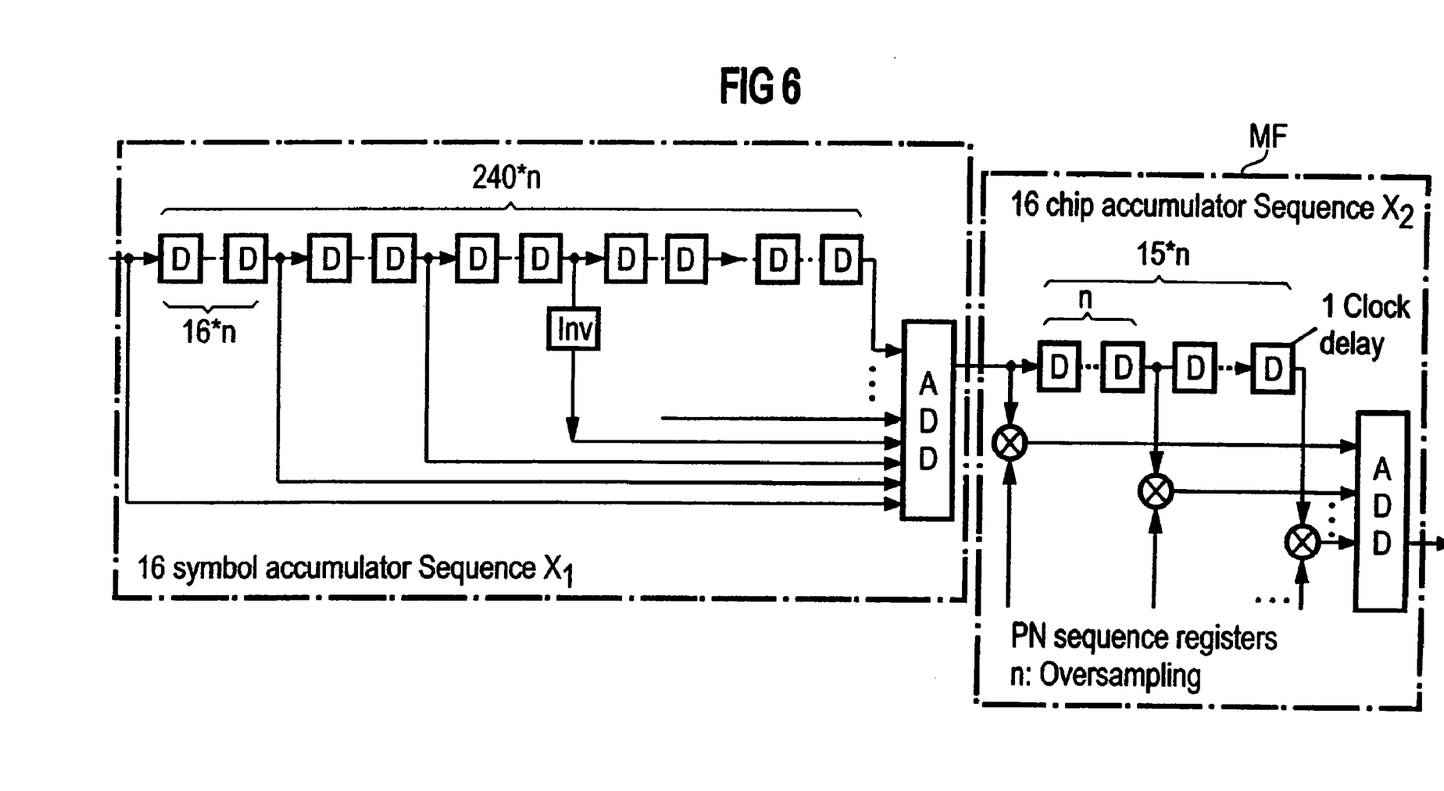

FIG. 6 shows firstly an efficient correlator for simple hierarchical sequences, and a simple correlation method for the hierarchical correlation.

The hierarchical correlation consists of two concatenated, matched filter blocks which, in each case, carry out a standardized correlation via one of the constituent sequences. It is assumed that the correlation via $X_1$ (16-symbol accumulation) is carried out before the correlation via $X_2$ (16-chip accumulation). This is one implementation option, because the two matched filter blocks (enclosed in dashed lines in FIG. 6) are linear systems which can be connected in any desired sequence. 240 n delay lines with the minimum word length can be implemented in this way since no accumulation is performed in advance and, therefore, no signal/interference gain is achieved. Here, n designates the oversampling factor, that is to say how many samples are carried out per chip interval.

As already mentioned, one or both of the matched filter blocks again can be replaced by a correlator for a (generalized) hierarchical sequence or by an efficient Golay correlator (EGC).

Figure 7:
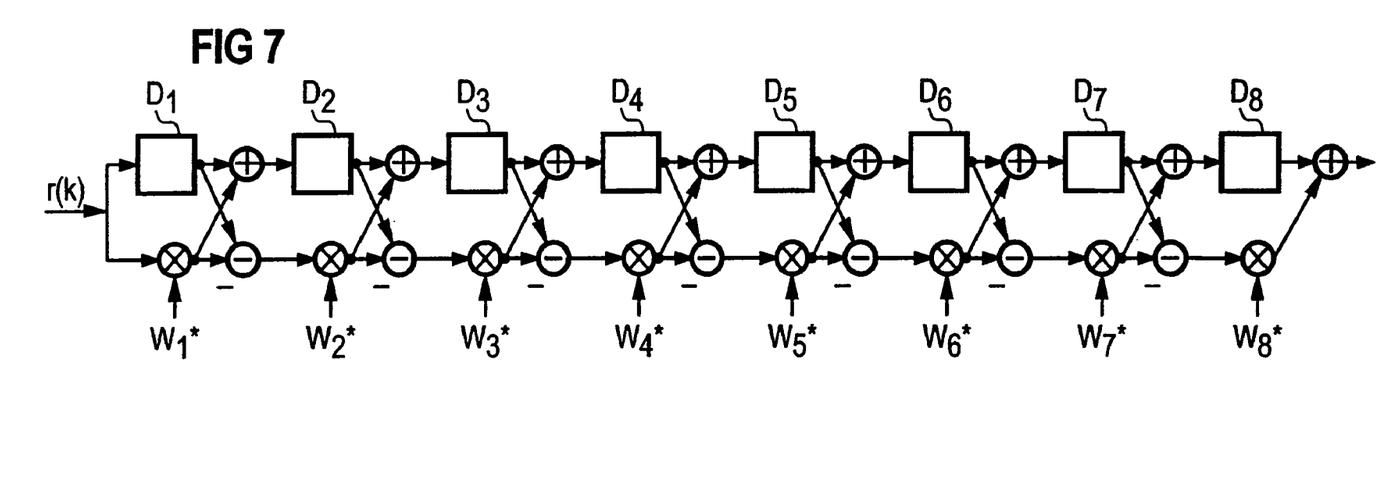

FIG. 7 shows a simple correlation method for the efficient Golay correlator (EGC) for a simple Golay sequence. The design of an efficient hierarchical Golay correlator corresponds to an efficient correlator for simple hierarchical sequences (see FIG. 6), with the exception that two adders can be omitted.

Figure 8:
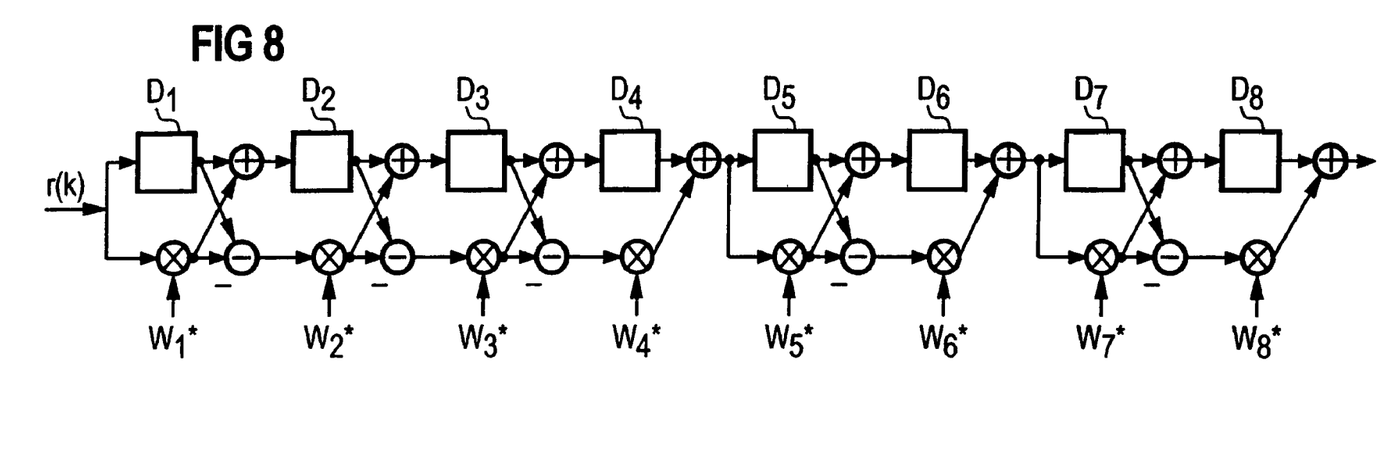

FIG. 8 now shows an efficient Golay correlator for a generalized hierarchical Golay sequence. The saving of two adders from 15 adders clearly reduces the complexity of the method accordingly.

Figure 9:
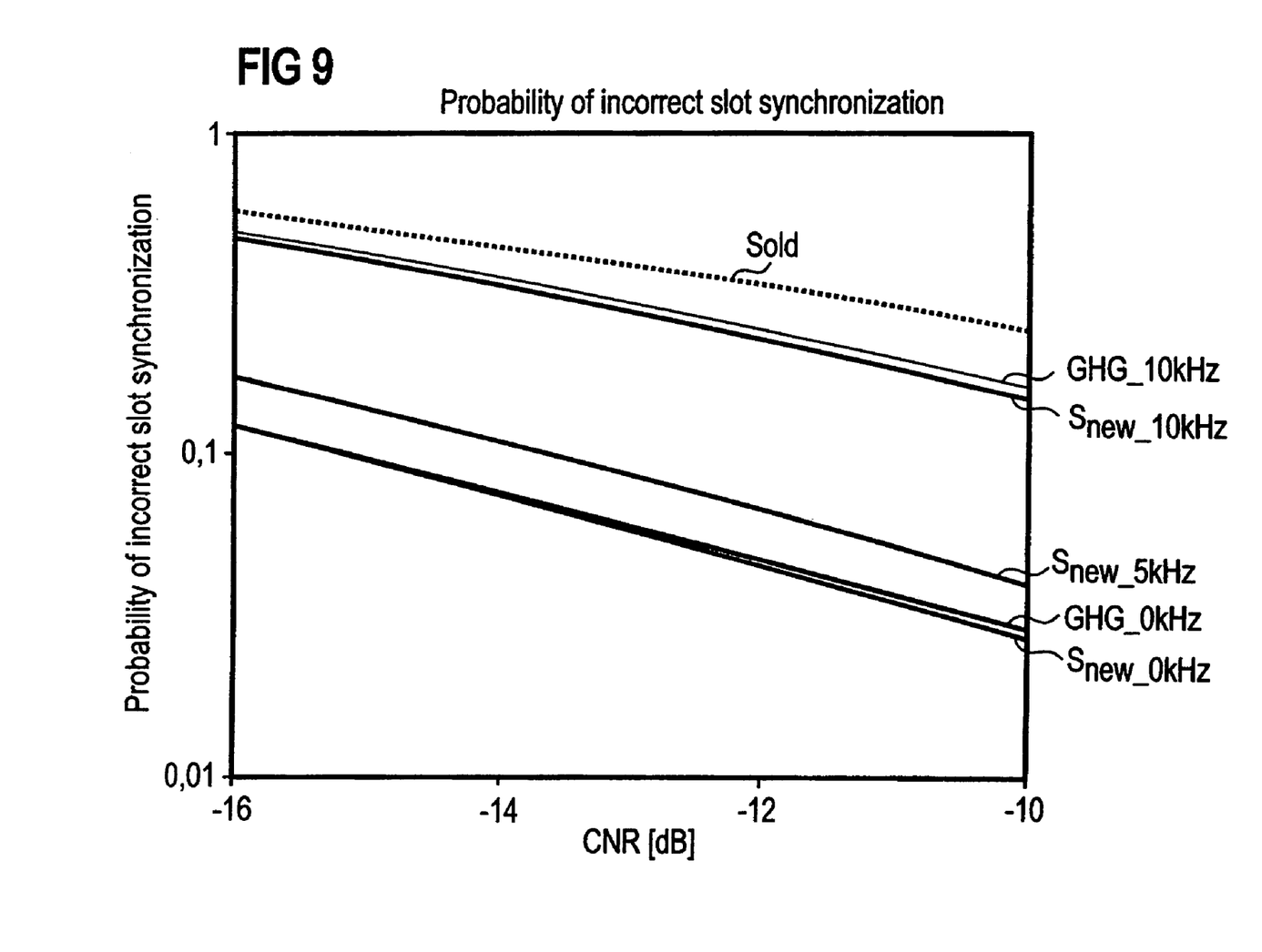
FIG. 9 shows a diagram with simulation results.

FIG. 9 shows simulation results, the slot-synchronization step having been investigated in a single-path Rayleigh fading channel with 3 km/h for various chip/noise ratios (CNR) without and with frequency errors. It is shown that, by comparison with another synchronization code, designated as $S_{new}$ below, the above-defined synchronization code, designated as GHG below, is just as well suited in practice with regard to the slot-synchronization power. Results are available for the use of averaging with 24 slots. A secondary synchronization channel, which is based on a random selection from 32 symbols, is transmitted in common with the primary synchronization channel (PSC). The graph shows that there is no substantial difference between the synchronization code $S_{new}$ and the generalized hierarchical Golay synchronization code GHG for no frequency error and for a frequency error of 10 kHz.

The proposed synchronization sequence GHG has better autocorrelation properties than $S_{old}$ (dotted curve), particularly in the case of 10 kHz. The graph shows that the synchronization properties of GHG are thus optimal with reference to the practical use. $S_{old}$ is a hierarchical correlation sequence that is not especially optimized for frequency errors.

The use of the generalized hierarchical Golay sequences for the primary synchronization channel (PSC) thus reduces the computational complexity at the receiving end; the complexity is reduced to only 13 additions by comparison with the conventional sequences of 30 additions and/or by comparison with Golay sequences of 15 additions per output sample.

The simulations show that the proposed synchronization sequence GHG have good synchronization properties in the case both of low and of relatively high errors. Because of a lower computational complexity, less specific hardware is required for implementation, and a lower power consumption is achieved.

Although the present invention has been described with reference to specific embodiments, those of skill in the art will recognize that changes may be made thereto without departing from the spirit and scope of the invention as set forth in the hereafter appended claims.

What is claimed is:

1. A method for synchronizing a base station with a mobile station, the method comprising the steps of:
   forming a synchronization sequence y(i) of length n, to be emitted by the base station, in accordance with the following relationship from a first constituent sequence x1 of length n1 and a second constituent sequence x2 of length n2: $y(i)=x_2(i \bmod n_2)*x_1(i \text{ div } n_2)$ for i=0 . . . $(n_1*n_2)$−1; and
   forming at least one constituent sequence $x_1$ or $x_2$ in accordance with the following relationship from a third constituent sequence x3 of length n3 and a fourth constituent sequence x4 of length n4:

$x_1(i)=x_4(i \bmod s+s*(i \text{ div } sn_3))*x_3((i \text{ div } s)\bmod n_3)$,
   i=0 . . . $(n_3*n_4)$−1; or $x_2(i)=x_4(i \bmod s+s*(i \text{ div } sn_3))*x_3((i \text{ div } s)\bmod n_3)$,
   i=0 . . . $(n_3*n_4)$−1.

2. A method for synchronizing a base station with a mobile station as claimed in claim 1, wherein the synchronization sequence y(i) is of length 256, and the constituent sequences x1, x2 are of length 16.

3. A method for synchronizing a base station with a mobile station as claimed in claim 1, wherein at least one of the constituent sequences x1 or x2 is a Golay sequence.

4. A method for synchronizing a base station with a mobile station as claimed in claim 3, wherein at least one of the two constituent sequences $x_1$ or $x_2$ is a Golay sequence which is based on the following parameters:

delay matrix $D^1=[8, 4, 1, 2]$ and weight matrix $W^1=[1, -1, 1, 1]$; or delay matrix $D^2=[8, 4, 1, 2]$ and weight matrix $W^2=[1, -1, 1, 1]$.

5. A method for synchronizing a base station with a mobile station as claimed in claim 1, wherein $x_3$ and $x_4$ are identical Golay sequences of length 4 and are based on the following parameters:

delay matrix $D^3=D^4=[1, 2]$ and weight matrix $W^3=W^4=[1, 1]$.

6. A method for synchronizing a base station with a mobile station as claimed in claim 3, wherein a Golay sequence $a_N$ is defined by the following recursive relationship:

$a_0(k)=\delta(k)$ and $b_0(k)=\delta(k)$ $a_n(k)=a_{n-1}(k)+W_n \cdot b_{n-1}(k-D_n)$, $b_n(k)=a_{n-1}(k)-W_n \cdot b_{n-1}(k-D_n)$, k=0, 1, 2 ..., $2^N$, n=1, 2, ..., N, $\delta(k)$ Kronecker delta function.

7. A method for synchronizing a base station with a mobile station as claimed in claim 1, wherein the synchronization sequence y(i) is received by a mobile station and processed for synchronization purposes.

8. A method for synchronizing a base station with a mobile station as claimed in claim 1, wherein in order to determine a prescribed synchronization sequence y(i) contained in a received signal sequence, correlation sums of the synchronization sequence y(i) are determined in the mobile station with the aid of corresponding sections of the received signal sequence.

9. A method for synchronizing a base station with a mobile station as claimed in claim 8, at least one efficient Golay correlator is used to determine at least one correlation sum.

10. A transmitting unit comprising:

a part for storing or forming a synchronization sequence y(i), which can be formed in accordance with the following relationship from a first constituent sequence x1 of length n1 and a second constituent sequence x2 of length n2:

$y(i)=x_2(i \bmod n_2)*x_1(i \operatorname{div} n_2)$ for i=0 ... $(n_1*n_2)-1$, wherein it is further possible to form at least one constituent sequence $x_1$ or $x_2$ in accordance with the following relationship from a third constituent sequence x3 of length n3 and a fourth constituent sequence x4 of length n4:

$x_1(i)=x_4(i \bmod s+s*(i \operatorname{div} sn_3))*x_3((i \operatorname{div} s) \bmod n_3)$,
i=0 ... $(n_3*n_4)-1$; or $x_2(i)=x_4(i \bmod s+s*(i \operatorname{div} sn_3))*x_3((i \operatorname{div} s) \bmod n_3)$,
i=0 ... $(n_3*n_4)-1$, and a part for emitting the synchronization sequence y(i) for synchronization with a receiving unit.

11. A mobile station comprising:

a part for receiving a received signal sequence; and a part for determining a synchronization sequence y(i), which can be formed in accordance with the following relationship from a first constituent sequence x1 of length n1 and a second constituent sequence x2 of length n2:

$y(i)=x_2(i \bmod n_2)*x_1(i \operatorname{div} n_2)$ for i=0 ... $(n_1*n_2)-1$, wherein it is further possible to form at least one constituent sequence $x_1$ or $x_2$ in accordance with the following relationship from a third constituent sequence x3 of length n3 and a fourth constituent sequence x4 of length n4:

$x_1(i)=x_4(i \bmod s+s*(i \operatorname{div} sn_3))*x_3((i \operatorname{div} s) \bmod n_3)$,
i=0 ... $(n_3*n_4)-1$; or $x_2(i)=x_4(i \bmod s+s*(i \operatorname{div} sn_3))*x_3((i \operatorname{div} s) \bmod n_3)$,
i=0 ... $(n_3*n_4)-1$.

12. A mobile station as claimed in claim 11, wherein the part for determining the synchronization sequence y(i) includes at least one efficient Golay correlator.

13. The mobile station as claimed in claim 11, wherein the part for determining the synchronization sequence y(i) includes two series-connected matched filters which are designed as efficient Golay correlators.

14. A method for transmitting and receiving synchronization sequences, the method comprising the steps of:

composing a synchronization sequence from two constituent sequences, wherein said synchronization sequence is structured having the following characteristics:

$y(i)=x_2(i \bmod s+s*(i \operatorname{div} sn_1))*x_1((i \operatorname{div} s) \bmod n_1)$,
i=0 ... $(n_1*n_2)-1$, where y(i) is the synchronization sequence having a length of $(n_1*n_2)$ from two constituent sequences $x_1$ and $x_2$ of length $n_1$ and $n_2$;

repeating a first constituent sequence in accordance with the number of elements of a second constituent sequence;

modulating all the elements of a specific repetition of the first constituent sequence with the corresponding element of the second constituent sequences; and mutually interleaving the repetitions of the first constituent sequence.

15. A method for transmitting and receiving synchronization sequences as claimed in claim 14, wherein a constituent sequence $x_2$ is composed from two constituent sequences $x_3$ of length $n_3$ and $x_4$ of length $n_4$ in accordance with the formula $x_2(i)=x_4(i \bmod s+s*(i \operatorname{div} sn_3))*x_3((i \operatorname{div} s) \bmod n_3)$, i=0, ... $(n_3*n_4)-1$, or is a Golay sequence.

16. A method for transmitting and receiving synchronization sequences as claimed in claim 14, wherein a constituent sequence $x_2$ is composed from two constituent sequences $x_3$ of length $n_3$ and $x_4$ of length $n_4$ in accordance with the formula $x_2(i)=x_4(i \bmod s+s*(i \operatorname{div} sn_3))*x_3((i \operatorname{div} s) \bmod n_3)$, i=0 ... $(n_3*n_4)-1$, or is a Golay sequence.

* * * * *